US006973120B1

(12) United States Patent (10) Patent No.: US 6,973,120 B1
Ouvry et al. (45) Date of Patent: Dec. 6, 2005

(54) RECEIVER FOR CDMA SYSTEM

(75) Inventors: Laurent Ouvry, Grenoble (FR); Didier Lattard, Rencurel (FR); Jean-René Lequepeys, Fontaine (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/701,391

(22) PCT Filed: Jun. 2, 1999

(86) PCT No.: PCT/FR99/01287

§ 371 (c)(1), (2), (4) Date: Dec. 4, 2000

(87) PCT Pub. No.: WO99/63678

PCT Pub. Date: Dec. 9, 1999

(30) Foreign Application Priority Data

Jun. 3, 1998 (FR) .................... 98 06952

(51) Int. Cl.[7] .................. H04B 15/00; H04K 1/00; H04K 27/30

(52) U.S. Cl. .............. 375/149; 375/150; 375/152; 375/343; 375/362

(58) Field of Search .............. 375/142–145, 375/148–150, 152, 343, 362; 370/335, 465

(56) References Cited

U.S. PATENT DOCUMENTS

| 4,984,247 | A | * | 1/1991 | Kaufmann et al. | ......... | 375/141 |
|---|---|---|---|---|---|---|
| 5,953,369 | A | * | 9/1999 | Suzuki | ......... | 375/148 |
| 6,084,932 | A | * | 7/2000 | Veintimilla | ......... | 375/355 |
| 6,215,778 | B1 | * | 4/2001 | Lomp et al. | ......... | 370/335 |

* cited by examiner

*Primary Examiner*—Phuong Phu
(74) *Attorney, Agent, or Firm*—Oblon, Spivak, McClelland, Maier & Neustadt, P.C.

(57) ABSTRACT

A receiver configured to receive signals corresponding to spread spectrum information symbol streams by pseudorandom binary sequences includes at least one channel ($V_1$) with an adapted filter (20) and with a symbol clock signal (Hs) recovery circuit (12) and other channels ($V_2, \ldots, V_k$) with a sliding correlator ($30_2, \ldots, 30_k$) using the symbol clock signal (Hs) produced by the channel ($V_1$) with adapted filter.

18 Claims, 5 Drawing Sheets

RECEIVER FOR CDMA SYSTEM

TECHNICAL FIELD

The object of the present invention is a receiver for a CDMA system, i.e. for code division multiple access systems, a technology known in English by the abbreviation CDMA. More generally, this technology falls within the framework of digital transmission with direct sequence spread spectrum (abbreviated to DSSS).

The invention finds applications in radiocommunications systems with mobiles, in wireless local area networks (WLAN), in wireless local loops (WLL), in cable television, etc.

PRIOR ART

It is assumed that the requirement is to transmit information constituted by a symbol stream of duration Ts, each symbol being able to be, for example, a bit equal to 0 or 1.

The direct sequence spread spectrum consists in modulating each symbol of the digital signal in a pseudorandom binary sequence. Such a sequence is composed of N pulses or "chips" the duration Tc of which is equal to Ts/N. The modulated signal has a spectrum which spreads over a range N times wider than that of the original signal. At reception, demodulation consists in correlating the signal with the sequence used at emission, which allows the information linked to the start symbol to be relocated.

The advantages of this technology are manifold:
discretion, since the power spectral density of the signal is reduced by a factor N;
immunity in respect of wanted or parasitic narrow band emissions, since the correlation operation carried out at receiver level leads to the spread spectrum of these emissions;
difficult interception since demodulation requires knowledge of the sequence used at emission;
resistance to multiple channels which, under certain conditions, cause selective fading in frequency and therefore only partially affect the signal emitted;
possible multiple access by allocation of different sequences to different users.

Turning this last advantage to good account, CDMA technology consists of the simultaneous emission, in a same band, of several spread signals using different pseudorandom spread sequences. The sequences are chosen so that the intercorrelations remain small.

If the different emitters do not have a common time reference, the system is said to be asynchronous since the beginnings of the symbols particular to each user reach the receiver at different moments. This is shown in the appended FIG. 1 where the lines in the left hand part show the time for three different users 1, 2, and 3 and the arrows pointing upwards show the emission start moments (the "tops") of the symbols. The central part shows symbolically the paths towards a same receiver. The right hand part shows the time position of the beginnings of the symbols received for each of the users, i.e., lastly, the dephases of the symbols of the different users relative to each other.

It can be arranged for the beginnings of the symbols received 1, 2 and 3 to coincide (modulo the period Ts of a symbol). The system is then said to be "synchronous". It is shown in FIG. 2 with the same conventions.

In an asynchronous CDMA system, the sequences have any relative phases at reception. A good separation of the signals presupposes therefore that the intercorrelations between sequences are small, whatever the relative phases between sequences. On the other hand, in synchronous CDMA, the sequences arriving with nil relative phases, the number of intercorrelations having to be close to zero is much smaller. This particularity gives the synchronous system a very clear advantage over the asynchronous variant in terms of the number of sequences (therefore of users) being able to coexist without mutual totally unacceptable disturbance.

These questions can be made rather clearer by giving an expression of the signal emitted and of the signal received. It will be hypothetically assumed that the different sequences linked to each symbol are synchronous. This implies that the number N, length of sequences counted as a number of chips, takes the same value whatever the sequence (or the emission) concerned.

Given these hypotheses, the emitted signal may be expressed, in base-band, by an emitter of rank k by the expression:

$$S_k(t) = A_k \sum_{i=0}^{+\infty} a_k(i) \sum_{j=0}^{N-1} c_k(j) p(t - jT_c - iNT_c + \tau_{0k})$$

with:
$A_k$: amplitude of the signal emitted by the user of rank k,
$a_k(i)$: symbols of rank i emitted by the user k,
$c_k(j)$: chip of rank j of the sequence k,
$T_c$: chip time,
p(.): chip form; this is most often a rectangular pulse different from zero between 0 and Tc,
$\tau_{0k}$: signal k delay (or advance).

It is assumed, so as to simplify the model that the channels are not selective in frequency.

The pulse response of a channel for the user of rank k is:

$$h_k(t) = g_k \delta(t - \tau_k)$$

with:
$g_k$: complex gain corresponding to the channel of rank k,
$\tau_k$: delay introduced by the channel k,
$\delta$: Dirac pulse.

The signal received may be written in the form:

$$r(t) = \sum_{k=0}^{k-1} S_k(t) * h_k(t)$$

where the sign * indicates a convolution product This expression may further be written:

$$r(t) = \sum_{k=0}^{k-1} g_k A_k \sum_{i=0}^{+\infty} a_k(i) \sum_{j=0}^{N-1} c_k(j) p(t - jT_c - iNT_c + \tau_{0k} - \tau_k)$$

If the system is synchronous, then $\tau_{0k} - \tau_k = \tau$ whatever k may be where $\tau$ is anything. Thus, in emitters, the $\tau_{0k}$ must be adjusted so that this relation is verified.

In the event of there being only one emitting source, this condition would obviously be fulfilled.

The appended FIG. 3 shows the principle of a spread spectrum signal receiver. The receiver shown includes a first circuit 10, which can be an adapted filter or a sliding correlator, a recovery circuit 12 of a symbol clock signal, a signal which allows synchronisation of the receiver means, possibly a processing circuit 14 able to effect different additional processes, such as for example a delayed multiplication, a channel estimation etc., and lastly a circuit 16 able to make a decision on the value of the symbol transmitted.

If there are several users, therefore several distinct sequences, the receiver includes as many channels as sequences, as shown in FIG. 4, with channels $V_1, V_2, \ldots, V_k$ where K is the number of users (or sequences). Each channel restores the symbols $d_1, d_2, \ldots, d_k$, particular to its sequence, therefore to the user.

Components are commercially available today to make such receivers. As an example the following may be quoted:
the component HFA 3860 of the Harris company, which uses a bank of 8 sliding correlators (called serial correlators) arranged in parallel (as shown in FIG. 4); symbol clock recovery is effected by means of a transmission preamble;
the component SC2001 of the Sirius Communications company, which incorporates a bank of sliding correlators allowing a signal with two synchronous users to be processed.

The first circuit of each channel, whether it is a sliding correlator or an adapted filter, plays an important role which may be clarified by means of FIGS. 5 and 6.

A sliding correlator (FIG. 5) includes diagrammatically a pseudorandom sequence generator 20 and a multiplier 22 receiving the input signal r(t) and the sequence delivered by the generator 20, an adder 24, a circuit 26 linked to the output of the adder 24 and relooped onto it and making a delay. The sliding correlator output is connected to a sub-sampler 28. The circuits 20, 26, 28 are controlled by a symbol clock signal Hs.

As for the adapted filter (FIG. 6), this is in general a digital filter 30 the coefficients of which are adapted to the sequence used. This filter receives the input signal r(t) and delivers a filtered signal again applied to a sub-sampler 28. The latter is controlled by the symbol clock signal Hs, which fixes the symbol rate.

Seen from the output of the sub-sampler 28, these two architectures are equivalent. On the other hand, seen from the input of the sub-sampler 28, they are different since they do not deliver the same signal, as FIGS. 7, 8 and 9 show.

FIG. 7, first of all, shows the output Sf of the adapted digital filter in FIG. 6, in accordance with the rank n of the samples; FIG. 8 the output Sc of the sliding correlator in FIG. 5 when the emitted sequence local reply is aligned with the emitted sequence; and FIG. 9 the ouput Sc of this same sliding correlator when the sequence local reply is not aligned with the emitted sequence. The correlator peak carrying the information on the symbol is marked P in FIGS. 7 and 8.

It is clear, from these Figures, that the sliding correlator requires information linked to symbol timing, a signal called a "symbol clock" and denoted Hs, so that the sequence local reply is aligned with the sequence modulating the symbols received, otherwise demodulating the symbols is impossible (the case in FIG. 9). The adapted filter does not require this information. Thus, what differentiates in the first instance a structure with a sliding correlator and a structure with an adapted filter, is that the first requires external synchronisation information.

An adapted filter enables symbol clock recovery, for example by recursive detection of the correlation peak on a window of N points (FIG. 7). Symbol clock recovery is also possible by means of a sliding correlator, but in a more complex way; it is necessary to modify step by step the sequence local reply phase until the sliding correlator output corresponds to a power maximum, therefore to a correlation peak (the case in FIG. 8).

If these two structures allow the symbol clock to be relocated, they do not do so with the same speed: the symbol clock recovery operation lasts at the most N symbol periods, i.e. NTs with a sliding correlator, whereas it requires only a single symbol period Ts with an adapted filter.

The advantage of the adapted filter is therefore obvious in terms of the rapidity of symbol clock signal acquisition. Its disadvantage is its operational complexity, since its installation in the form of a digital filter with finite pulse response (working at the chip rate) requires N multiplications and N additions for each sample. Its structural complexity goes hand in hand with its operational complexity.

The sliding correlator only effects one multiplication and one addition for each new sample. If it is relatively ill adapted to clock recovery, it is on the other hand very advantageous in terms of operational complexity.

Thus, whether recourse is made to adapted filters or to sliding correlators certain disadvantages cannot be avoided. The purpose of the present invention is precisely to overcome these.

DISCLOSURE OF THE INVENTION

The invention proposes to combine the advantages of each of these structures (adapted filter and sliding correlator) by using, in a multiple channel receiver, an adapted filter in at least one channel, this in order to restore rapidly and efficiently the symbol clock, and by using sliding correlators in the other channels so as to benefit from their low level complexity, these correlators being controlled by the symbol clock signal produced by the adapted filter.

The receiver of the invention is thus a hybrid, in the sense that it includes at least one channel using an adapted filter and other channels using sliding correlators. The complexity of the receiver is reduced by the use of correlators, without the efficiency of the symbol clock signal restoration suffering as a result since the latter is provided by an adapted digital filter.

It may be noted that in some mobile telephone installations both an adapted filter and sliding correlators can be found, the adapted filter delivering a synchronisation signal. But, in these installations, the filter is adapted to a very particular sequence called a pilot and not to the sequences used to carry information. This adapted filter only operates therefore at the moment of pilot symbol reception. The sliding correlations then process the sequences carrying the information, whereas the adapted filter is inoperative. Synchronisation is therefore obtained prior to demodulation.

In the present invention, the adapted filter processes symbols carrying the information and permanently maintains the clock signal necessary to sliding correlators.

When the synchronism between the sequences is not perfect, it is possible to use several channels of the type with adapted filter, (instead of just one) so as to produce several symbol clock signals slightly offset relative to each other.

In an exact way, the object of the present invention is a receiver for CDMA system, intended to receive signals corresponding to streams of spread spectrum information symbols by pseudorandom binary sequences, this receiver including K processing channels and being characterised in that at least one of these channels includes a filter adapted to one of the pseudorandom sequences having been used for information symbols spectrum spreading and a symbol timing clock signal recovery circuit, the other channels each including a sliding correlator working with one of the other sequences having been used for information symbols spectrum spreading, each sliding correlator being controlled by a symbol clock signal, which is the clock signal produced by the channel using the adapted filter.

DESCRIPTION OF A PARTICULAR EMBODIMENT OF THE INVENTION

Figure 1:
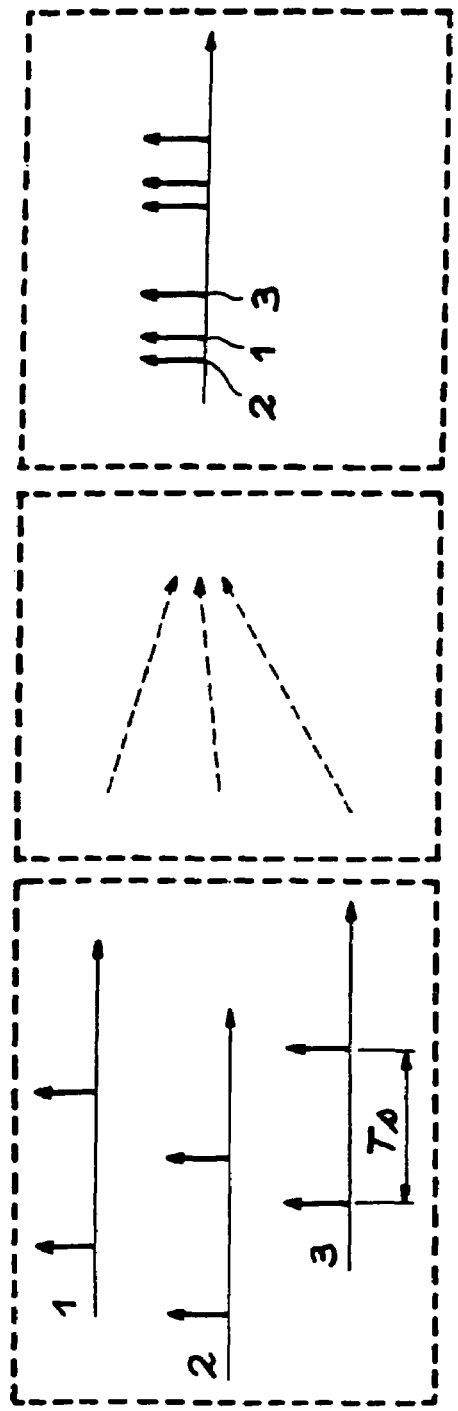
FIG. 1, already described, shows the symbol beginning times for three users in an asynchronous CDMA system.
Figure 2:
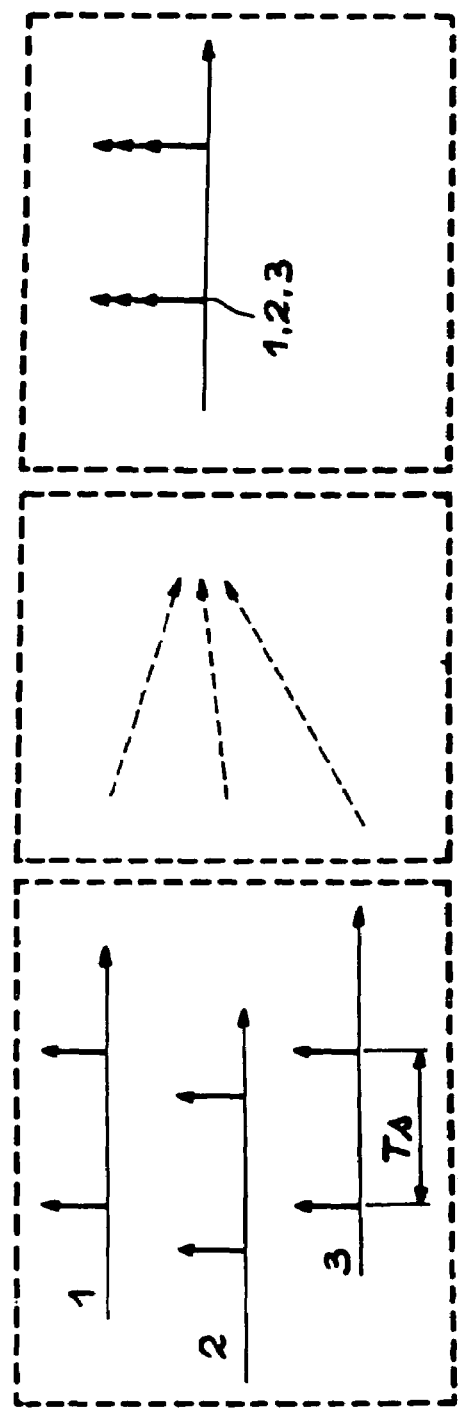
FIG. 2, already described, shows the symbol beginning times for three users in a synchronous CDMA system.
Figure 3:
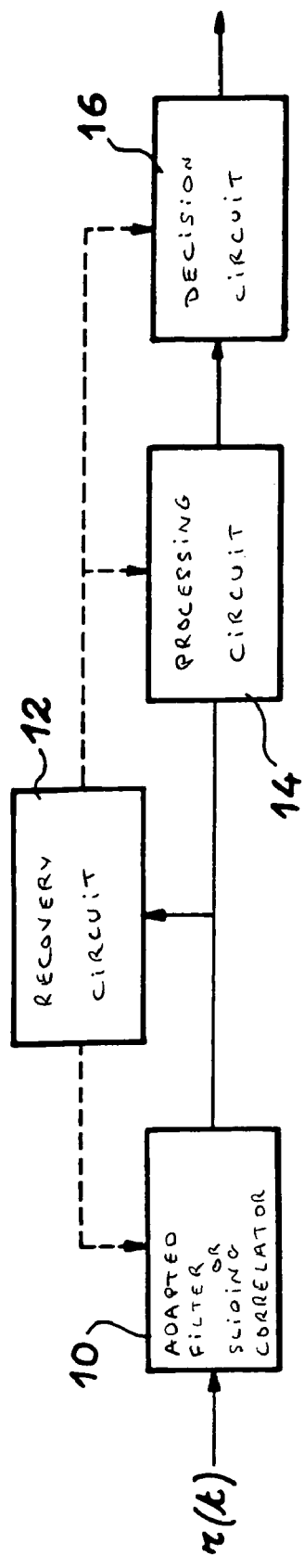
FIG. 3, already described, shows a known receiver architecture.
Figure 4:
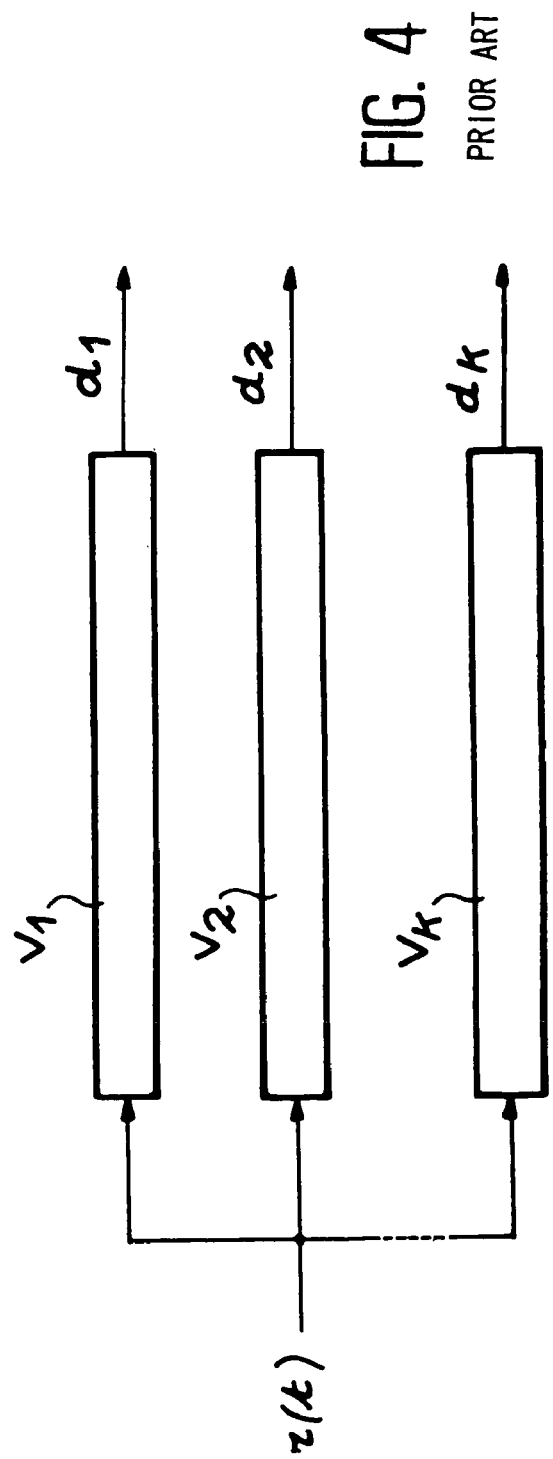
FIG. 4, already described, shows a multi-channel architecture in parallel.
Figure 5:
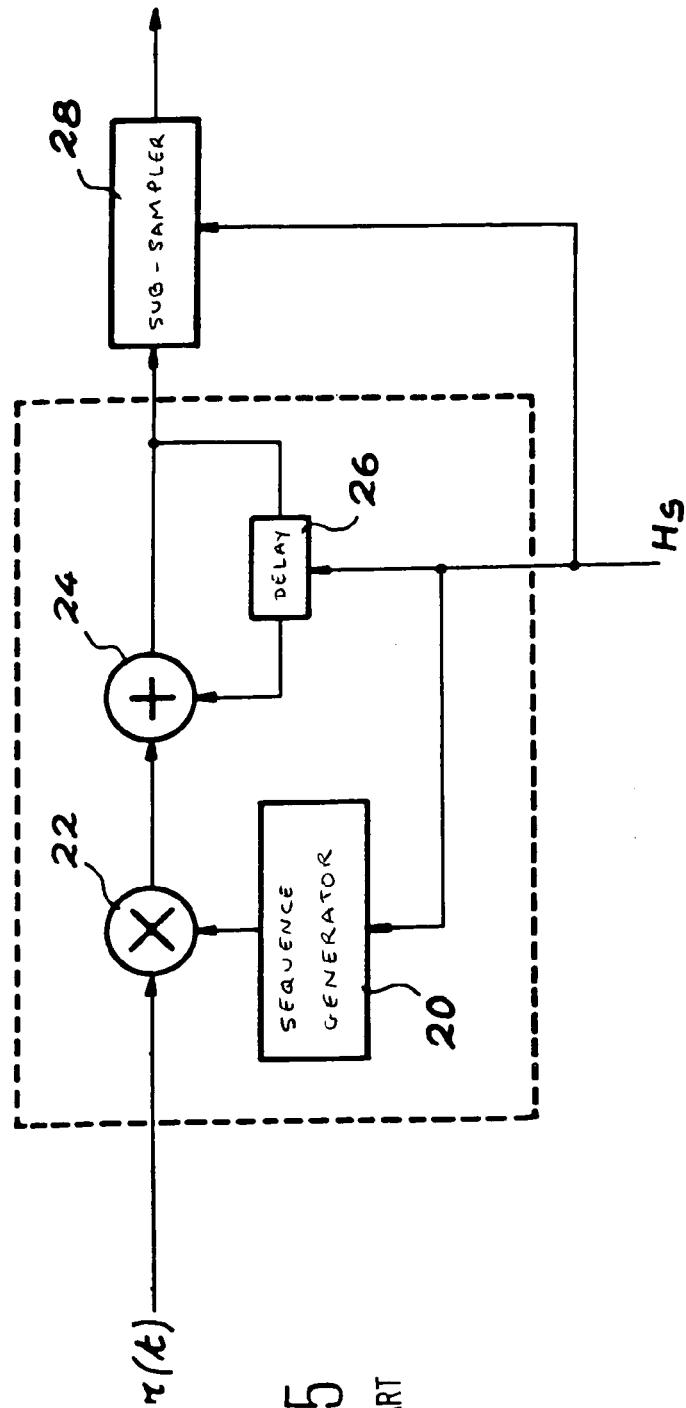
FIG. 5, already described, shows a sliding correlator structure.
Figure 6:
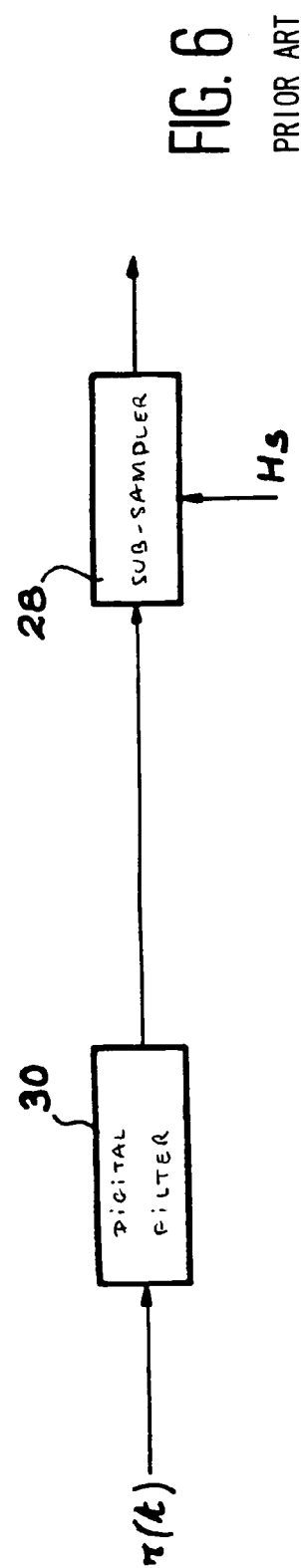
FIG. 6, already described, shows an adapted filter structure.
Figure 7:
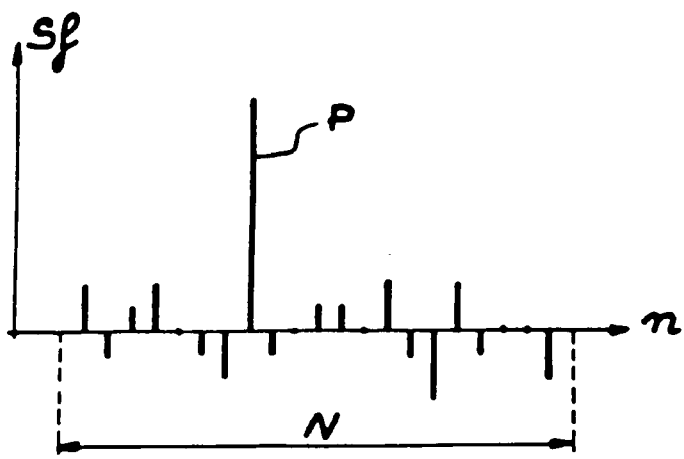
FIG. 7, already described, shows an adapted filter output.
Figure 8:
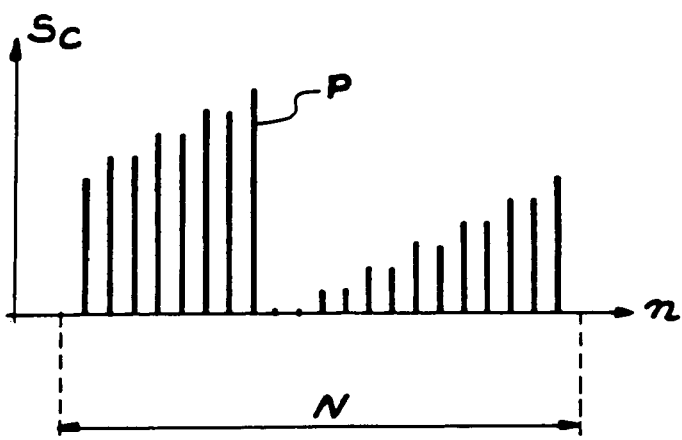
FIG. 8, already described, shows a sliding correlator output when the sequence local reply is aligned with the sequence emitted.
Figure 9:
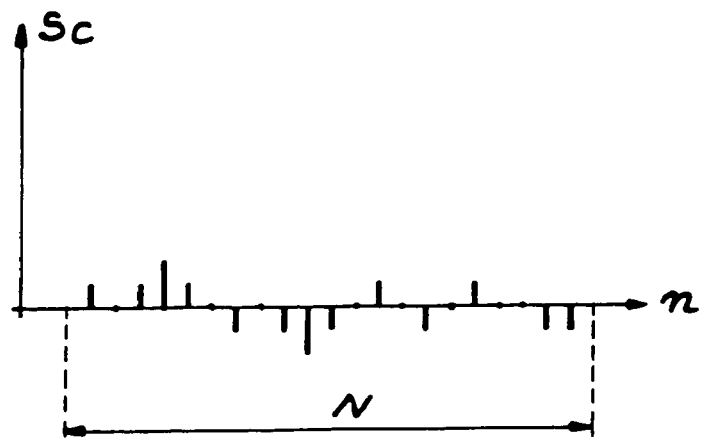
FIG. 9, already described, shows a sliding correlator output when the sequence local reply is not aligned with the sequence emitted.
Figure 10:
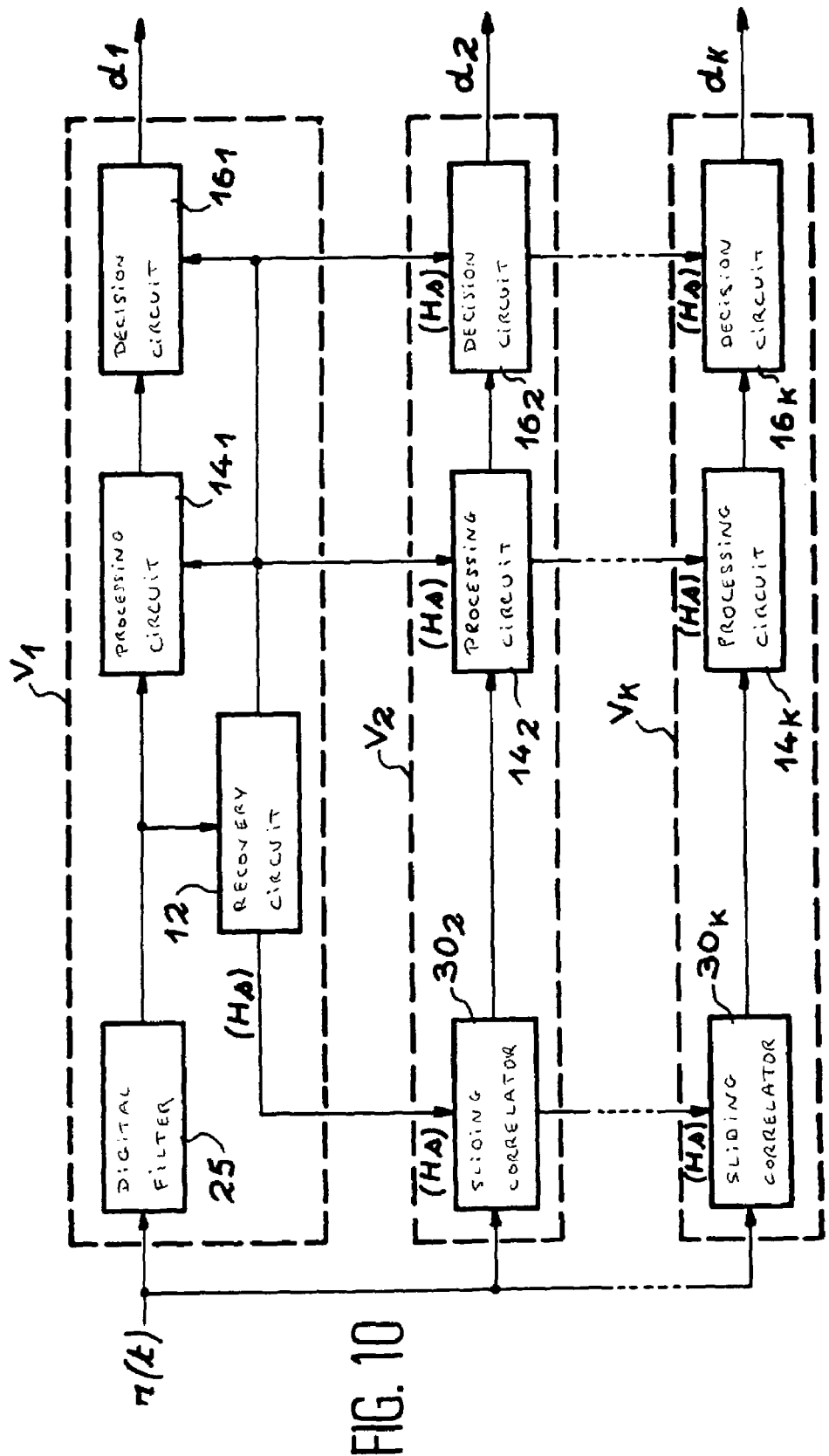
FIG. 10 shows an embodiment of a receiver according to the invention.

FIG. 10 shows a receiver according to the invention. This receiver includes K channels, $V_1, V_2, \ldots, V_k$ of which one channel $V_1$ uses an adapted filter, whereas the K−1 other channels $V_2, \ldots, V_k$ use a sliding correlator. More exactly, the channel $V_1$ includes a digital filter 25 the coefficients of which are adapted to the sequence No. 1 used at emission, a symbol clock Hs recovery circuit 12, an additional processing circuit $14_1$, able to effect, for example, a delayed multiplication, a channel estimation, etc. and lastly a decision circuit $16_1$, restoring the information $d_1$ particular to the user having used this first sequence.

The channel $V_2$ includes a sliding correlator 302, an additional processing circuit $14_2$ and a decision circuit $16_2$ delivering the restored information $d_2$. Likewise for the other channels, and in particular for the $V_k$, which includes a correlator $30_k$, a processing circuit $14_k$ and a decision circuit $16_k$ restoring the information $d_k$. The correlators $30_2, \ldots, 30_k$, require, as has been explained, a clock signal in order to be synchronised and this is constituted, in accordance with the invention, by the symbol clock Hs signal recovered in the first channel $V_1$. This clock may also be applied to the circuits $14_1, 14_2, \ldots, 14_K$ and $16_1, 16_2, \ldots, 16_K$.

Table 1 allows an architecture according to the invention to be compared with a conventional architecture using either sliding correlators, or adapted filters. The comparison is made in terms of operational complexity and symbol clock acquisition time (for K synchronous emitters and sequences of length N).

TABLE 1

|  | Receiver of the invention | Conventional receiver with adapted filters | Conventional receiver with sliding correlators |
|---|---|---|---|
| symbol clock acquisition time (by period Ts) | 1 | 1 | <N |
| Operational complexity (by number of multiplications per sampling period) | N + K − 1 | KN | K |
| Operational complexity (by number of additions per sampling period) | N + K − 1 | KN | K |

By way of example, the case may be taken of K=64 synchronous users with sequences of N=128 chips:

with a structure with 64 adapted filters, it is necessary to carry out 16,384 operations for each new sample, the acquisition being able to be achieved in 1 single symbol;

with a structure with 64 sliding correlators, it is necessary to carry out 128 operations for each new sample, the acquisition being achieved in a maximum of 128 symbols;

with a hybrid structure according to the invention, with 1 adapted filter and 127 sliding correlators, it is necessary to make 382 operations for each new sample, the acquisition being achieved in a single period.

From this example can be seen the excellent compromise obtained by the structure proposed by the invention. Moreover, it must be understood that a non hybrid structure with adapted filters would be excessively costly, if not even unrealisable on account of problems of size.

To sum up, the structure proposed by the invention makes it possible to:

benefit from the synchronism between system users and from simultaneously acquiring the symbol clock of all users;

profit from all the advantages of the structure with adapted filter;

produce rapidly and reliably a symbol clock signal by using an adapted filter;

pilot channels with sliding correlators with the symbol clock signal thus produced;

benefit from the low level complexity of structures with sliding correlators;

integrate, into a single circuit, the demodulation of a large number of emitters.

What is claimed is:

1. A receiver for a CDMA system, intended to receive signals corresponding to spread spectrum information symbol streams by pseudorandom binary sequences, said receiver comprising processing channels wherein:

at least one of said channels includes
 a digital filter with coefficients adapted to one of said pseudorandom binary sequences having been used for information symbols spectrum spreading, and
 a recovery circuit configured to produce a clock signal, other channels each includes a sliding correlator working with another one of said pseudorandom binary sequences having been used for information symbols spectrum spreading, each sliding correlator being controlled by said clock signal produced by said recovery circuit of said at least one channel which includes said digital adapted filter.

2. The receiver according to claim 1, wherein said digital adapted filter is configured to process said signals corresponding to spread spectrum information symbol streams.

3. The receiver according to claim 1, wherein said digital adapted filter is configured to maintain said clock signal controlling said sliding correlators.

4. The receiver according to claim 3, wherein said digital adapted filter is configured to maintain said clock signal permanently.

5. The receiver according to claim 1, wherein the at least one of said channels further comprises a processing circuit connected to an output of said digital filter and the other channels each further comprises a processing circuit connected to an output of the corresponding sliding correlator.

6. The receiver according to claim 5, wherein said processing circuits are configured to perform a delayed multiplication.

7. The receiver according to claim 5, wherein said processing circuits are configured to perform a channel estimation.

8. The receiver according to claim 1, wherein the at least one of said channels further comprises a decision circuit connected to an output of said digital filter and the other channels each further comprises a decision circuit connected to an output of the corresponding sliding correlator.

9. The receiver according to claim 1, comprising a plurality of the processing channels, each including a filter adapted to one of said pseudorandom binary sequences.

10. The receiver according to claim 9, wherein said plurality of processing channel produces a plurality of clock signals offset relative to each other.

11. A receiver for receiving signals comprising:
a first channel configured to process a first signal of said signals and to recover a clock signal from said first signal, a spectrum of said signals being spread using sequences, said first cannel including a digital filter having coefficients adapted to a first sequence of said sequences; and
a second channel configured to process a second signal of said signals, said second channel being controlled by said clock signal recovered from said first channel, said second channel being free of a clock signal recovering circuit.

12. The receiver according to claim 11, wherein said first channel maintains said clock signal.

13. The receiver according to claim 12, wherein said first channel maintains said clock signal permanently.

14. The receiver according to claim 11, wherein said sequences are at least one of pseudorandom or binary.

15. The receiver according to claim 11, wherein said second channel includes a sliding correlator, said sliding correlator being configured to receive said second signal and being controlled by said clock signal.

16. The receiver according to claim 11, comprising a third channel configured to process a third signal of said signals and to recover a second clock signal from said third signal.

17. The receiver according to claim 16, wherein said clock signal recovered from said first signal and said second clock signal are offset relative to each other.

18. The receiver according to claim 11, wherein said signals correspond to CDMA signals.

* * * * *